(No Model.)
F. W. BAGUHN.
DRAFT EQUALIZER.
No. 495,953. Patented Apr. 25, 1893.
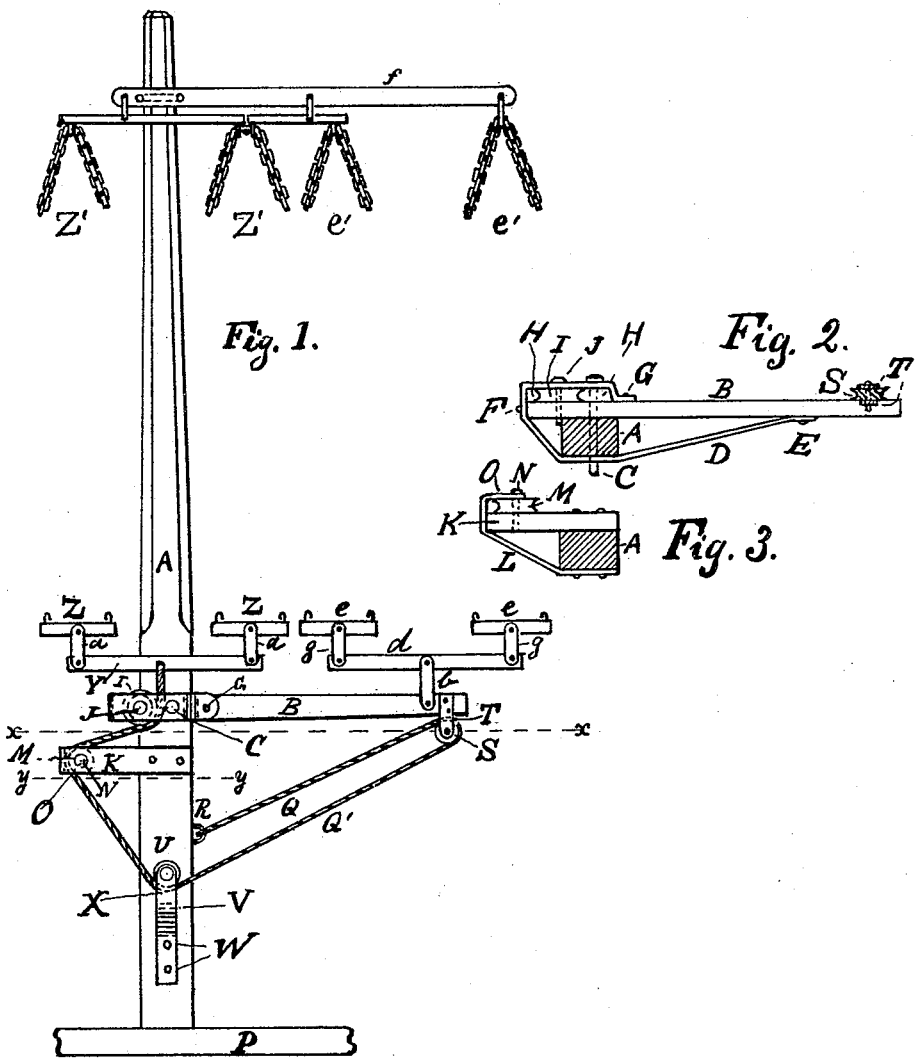
WITNESSES:
G. E. N. Sward.
A. J. Carlsen.
INVENTOR,
Fredrick W. Baguhn
BY Andrew M. Carlsen
ATTORNEY.

United States Patent Office.

FREDRICK W. BAGUHN, OF OWEGO, NORTH DAKOTA.

DRAFT-EQUALIZER.

SPECIFICATION forming part of Letters Patent No. 495,953, dated April 25, 1893.

Application filed May 26, 1892. Serial No. 434,477. (No model.)

*To all whom it may concern:*

Be it known that I, FREDRICK W. BAGUHN, a citizen of the United States, residing at Owego, in the county of Ransom and State of North Dakota, have invented certain new and useful Improvements in Draft-Equalizers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to draft-equalizers and has for its purpose to equalize the draft of three horses upon one side of a draft-pole with that of one horse upon the other side of the draft-pole. I attain this object by the novel construction and arrangements of parts illustrated in the accompanying drawings in which, Figure 1 is a top plan view of a draft pole with my equalizer applied to it and a corresponding neck yoke at the front end of the pole. Fig. 2 is a rear sectional view of Fig. 1 on the line x, x, with the cord Q, removed. Fig. 3 is a rear sectional view of Fig. 1 on the line y, y, with the rope, Q, removed.

Referring to the drawings by letter, A. represents the draft-pole.

B. is a draft lever pivoted to the pole A. by the pivot bolt C.

D is a supporting brace for the lever B, to which it is secured by the three bolts E, F, G, and is pivoted to the pole by the same bolt C, on which the lever is pivoted. It will be observed that this brace D, is of one continuous strip of iron and is offset upward from the upper surface of the lever B, so as to form an opening H, H. between the lever and the brace. In this opening is pivotally placed the sheave I, which revolves upon the pin J.

K, is a rigid arm secured upon the pole.

L, is a brace supporting said arm K, and forming a seat or house for the sheave M, which revolves upon the pin N, passed through the short end O, of the brace L, and down into the bar K.

P, represents a portion of a harvester or other machine to which the pole A, is rigidly secured.

Q, is a cord, wire rope or chain secured with one end to a staple R, in the side of the pole A, is then passed over a sheave S, mounted in a suitable sheave house T, secured near the free end of the lever B. From thence the rope is passed over a sheave U, mounted between the upper side of the pole and a brace V, which is bolted at W, to the pole and is offset upward from the pole, so as to give room for the sheave U, and the rope Q, to go between the pole and the front portion X, of the said brace. From the sheave U, the rope is further passed over the sheaves M, and I, and is finally secured to the middle of the doubletree Y, which rests loosely upon the pole and carries at each of its two ends the single-trees Z, secured to the double-tree by common links a.

Near the free end of the draft-lever B, I attach by the pivoted links b, another single-tree d, carrying at both of its ends the single-trees e attached thereto by the links g.

In operation the horses are hitched to the four single-trees Z, Z, and e, e, and to the corresponding breast strap chains, Z' and e' of the neck-yoke f, which is a preferable style of neck yoke to be used in connection with my equalizer. The horses at e, e, have the benefit of the long lever B, while the horses at Z, Z, have an equal gain of power derived from the two parts Q, and Q' of the rope Q. The equalizing may be further regulated by the location of the sheave U, more or less back upon the pole and by the length of the arm or lever K, as the location of the sheaves M and U, change the angles of the rope Q.

Having thus described my invention, what I claim, and desire to secure by Letters Patent, is—

1. In a draft equalizer for harvesters or other machines the combination of a draft pole, a lever pivoted to and extending about transversely out from one side of the pole, the singletrees e, and doubletrees d and y, one attached near the free end of said lever, the sheaves S, U, I, located substantially as shown, the rope or chain Q, passed over said sheaves and being attached with one end to the pole and the other end to the doubletree Y, having two singletrees Z, located one at each side of the pole, substantially as shown and for the purpose set forth.

2. In a draft-equalizer the combination with the rigid draft-pole A, with the swinging lever B, the brace D, sheave houses H, and T, the sheave-holding offset brace V, the rigid arm K, the sheave house O, and brace L, of which it is formed, the sheaves S, U, M, I, and rope Q, passing over all of said sheaves and being secured with one end to the pole and the other end to a double-tree carrying singletrees upon opposite sides of the pole, said draft-lever carrying a doubletree near its free end, substantially as shown and described and for the purpose set forth.

In testimony whereof I affix my signature in presence of two witnesses.

FREDRICK W. BAGUHN.

Witnesses:
ROBT. J. MITCHELL,
CHAS. A. GRAM.